(12) United States Patent
Houck (10) Patent No.: US 8,185,313 B2
(45) Date of Patent: May 22, 2012

(54) CLASSIFYING POTENTIAL HYDROCARBON RESERVOIRS USING ELECTROMAGNETIC SURVEY INFORMATION

(75) Inventor: Richard T. Houck, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 13/142,560

(22) PCT Filed: Dec. 9, 2009

(86) PCT No.: PCT/US2009/067362
§ 371 (c)(1),
(2), (4) Date: Jun. 28, 2011

(87) PCT Pub. No.: WO2010/098800
PCT Pub. Date: Sep. 2, 2010

(65) Prior Publication Data
US 2011/0301849 A1    Dec. 8, 2011

Related U.S. Application Data

(60) Provisional application No. 61/155,408, filed on Feb. 25, 2009.

(51) Int. Cl.
*G01V 3/18* (2006.01)
(52) U.S. Cl. ........................................................... 702/7
(58) Field of Classification Search .................. 702/7, 6; 703/2, 10
See application file for complete search history.

(56) References Cited

U.S. PATENT DOCUMENTS

| | | | |
|---|---|---|---|
| 6,035,255 A * | 3/2000 | Murphy et al. ................. | 702/11 |
| 6,603,313 B1 | 8/2003 | Srnka | |
| 6,999,879 B2 | 2/2006 | Houck | |
| 7,366,616 B2 | 4/2008 | Bennett et al. | |
| 7,383,132 B2 | 6/2008 | Green et al. | |
| 2007/0061117 A1 | 3/2007 | Landis, Jr. et al. | |
| 2007/0265782 A1 | 11/2007 | Kleinberg et al. | |
| 2008/0162049 A1 | 7/2008 | Harris | |
| 2008/0319674 A1 | 12/2008 | Dai et al. | |

OTHER PUBLICATIONS

Chen, J., et al., "A Bayesian Model for Gas Saturation Estimation Using Marine Seismic AVA and CSEM Data", *Geophysics*, vol. 72, No. 2, Mar. 1, 2007, pp. WA85-WA95.

Chen, J., et al., "Effects of Uncertainty in Rock-Physics Models on Reservoir Parameter Estimation Using Seismic Amplitude Variation With Angle and Controlled-Source Electromagnetics Data", *Geophysical Prospecting*, vol. 57, Jan. 2009, pp. 61-74.

Commer, M. et al. (2006) "Large Scale 3D EM Inversion Using Optimized Simulation Grids Non-Conformal to the Model Space," *Society of Exploration Geophysicists Annual Meeting Expanded Abstract*, 25, pp. 760-764.

Eidsvik, J. et al. (2008) "Value of Information of Seismic Amplitude and CSEM Resistivity," *Geophysics*, 73, pp. R59-R69.

(Continued)

*Primary Examiner* — Bryan Bui
(74) *Attorney, Agent, or Firm* — ExxonMobil Upstream Research Co. Law Dept.

(57) ABSTRACT

A probabilistic method for classifying observed CSEM response for a resistive anomaly to classify the response into multiple geologic categories indicative of hydrocarbon production potential. Each category is assigned a prior probability (301). For each category, conditional joint probability distributions for observed CSEM data in the anomaly region are constructed (303) from rock property probability distributions (302) and a quantitative relationship between rock/fluid properties and the CSEM data (304). Then, the joint probability distributions and prior probabilities for each category (305) are combined with observed data (307) and used in Bayes' Rule (306) to update the prior category probabilities (308). Seismic data may be used to supplement CSEM data in the method.

15 Claims, 4 Drawing Sheets

OTHER PUBLICATIONS

Houck, R. T. (1998) "Estimating Uncertainty in Interpreting Seismic Indicators," *Society of Exploration Geophysicists Annual Meeting Expanded Abstract*, 17, pp. 632-635.

Houck, R. T. (2002) "Quantifying the Uncertainty in an AVO Interpretation," *Geophysics*, 67, pp. 117-125.

Hoversten, G. M. et al. (2006) "Direct Reservoir Parameter Estimation Using Joint Inversion of Marine Seismic AVA and CSEM Data," *Geophysics*, 71, pp. C1-C13.

Mavko, G. et al. (1998) *The rock physics handbook*, Cambridge University Press, Chapter 9.4.

Mukerji, T. et al. (1998) "Applying Statistical Rock Physics and Seismic Inversions to Map Lithofacies and Pore Fluid Probabilities in a North Sea Reservoir," *Society of Exploration Geophysicists Annual Meeting Expanded Abstract*, 17, pp. 890-893.

Spikes, K. et al. (2007) "Probabilistic Seismic Inversion Based on Rock Physics Models," Geophysics, 72, pp. R87-R97.

* cited by examiner

CLASSIFYING POTENTIAL HYDROCARBON RESERVOIRS USING ELECTROMAGNETIC SURVEY INFORMATION

This application is the National Stage of International Application No. PCT/US2009/67362, that published as WO2010/098800, filed 9 Dec. 2009 which claims the benefit of U.S. Provisional Application No. 61/155,408, filed 25 Feb. 2009. The entirety of each of these applications is incorporated herein by reference for all purposes.

FIELD OF THE INVENTION

The invention relates generally to the field of geophysical prospecting and, more particularly, to electromagnetic surveying. Specifically, the invention is a method for classifying potential hydrocarbon reservoirs using electromagnetic survey information.

BACKGROUND OF THE INVENTION

Figure 1:
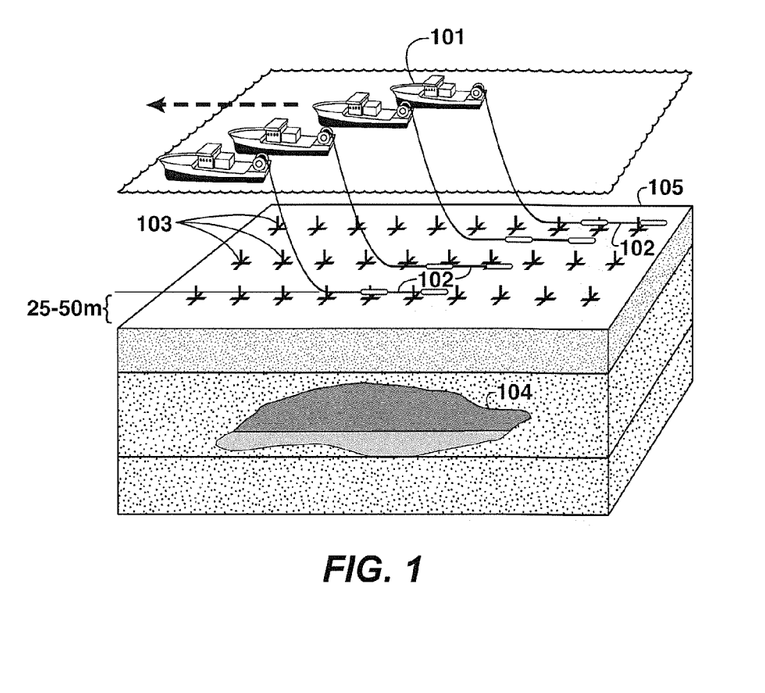
FIG. 1 is a schematic diagram illustrating a typical equipment deployment for a marine CSEM survey.

Controlled source electromagnetic (CSEM) surveys for mapping subsurface resistivity (Srnka, 2003) have recently come into common use for hydrocarbon exploration. FIG. 1 illustrates a common implementation of CSEM surveying in a marine environment; a different implementation is used for land surveys, but the physical principles involved are the same. A slowly moving (typically 1-2 knots) boat 101 tows a dipole antenna 102 typically 100-300 m in length just above the seafloor 105, driven by a low frequency (typically <10 Hz) high-powered (e.g. 120 kW) source of electric current, which may be located in the boat. The source produces an electromagnetic field that diffuses through the seawater and into the earth. The precise pattern of this diffusion depends on how resistivity is distributed in the subsurface. Electric and magnetic fields recorded on a set of receivers 103 placed at fixed locations on the seafloor characterize this pattern and can therefore be used to infer the spatial distribution of subsurface resistivity, for example resistive region 104 located among background layers that themselves can have varying resistivity as indicated by different gray shadings.

CSEM surveys are useful for detecting hydrocarbon reservoirs because hydrocarbon-bearing porous rock is more resistive than the same rock saturated with formation water. In fact, resistivity measurements made in boreholes (well logs) are routinely used to identify and evaluate hydrocarbon-bearing intervals around the borehole. One might expect that CSEM-derived resistivities could be used in a similar manner.

This expectation, however, has not been met for two reasons. First, CSEM data are sensitive to resistivities averaged over a large subsurface volume that may contain regions of both reservoir and non-reservoir rock. Consequently, CSEM methods are not usually able to unambiguously detect individual hydrocarbon-bearing intervals. Second, resistivity is affected by rock properties other than hydrocarbon saturation. In well log analysis, multiple types of logs are commonly available to provide values for these additional rock properties. Such information is not usually available for CSEM surveys, which are commonly acquired over exploration prospects that have not yet been drilled. Any method for quantitative interpretation of CSEM-derived resistivities must address these two issues.

Conventional interpretation of CSEM surveys is directed towards identifying regions of the subsurface that have anomalously high resistivity. Interpretation may involve simply comparing the fields recorded at each receiver to synthetic data computed from a "background" model of subsurface resistivity, or to data recorded on a "reference" receiver that is not expected to be near an anomalous resistivity. The most advanced interpretation methods perform inversion on the recorded fields (e.g., Commer and Newman [1]), and produce a 3D representation of subsurface resistivity that explains the recorded data. Locations where the CSEM data indicates that the resistivity is higher than in the surrounding rock are considered to be potential hydrocarbon reservoirs.

The relationship between CSEM-derived resistivity and hydrocarbon presence is, however, inherently ambiguous. The presence of high resistivity in the subsurface does not guarantee the presence of a hydrocarbon-bearing reservoir. For example, rocks that have very low porosity will have high resistivity even if they do not contain hydrocarbons. And, it is uncertain how high the subsurface resistivity should be before being designated as anomalous. Hydrocarbon-bearing rocks that also contain a significant amount of formation water may not have very high resistivity, and the low vertical resolution of CSEM means that CSEM-derived resistivities may be a mixture of high-resistivity reservoir and interbedded low resistivity non-reservoir rock. Such cases will be missed if the threshold for considering a resistivity to be "anomalous" is set too high.

Additional information, usually geologic or seismic, may be used to reduce this inherent ambiguity. For example, volcanic rocks can have very high resistivities, but if geologic information indicates that volcanics are not present in the survey area they can be eliminated as a possible cause of high resistivity. Seismic data that covers the area of the CSEM survey are normally available. Seismic amplitudes depend on some of the same rock properties as resistivity, so the seismic amplitude response can be combined with the CSEM-derived resistivities to reduce the uncertainty in the interpretation. Incorporating multiple types of information may reduce ambiguity, but normally does not eliminate it. In realistic cases, there is usually more than one possible explanation for the observed CSEM, seismic, and geologic information.

Summarizing, conventional CSEM interpretation does not make quantitative statements about potential hydrocarbon reservoirs because:

1. low vertical resolution means that CSEM-derived resistivities are not representative of individual reservoir intervals;
2. resistivity depends on many rock properties that are poorly known in exploration situations; and
3. the observed data does not uniquely constrain the potential reservoir, even if seismic amplitude information is included.

The current invention addresses all three of these problems.

SUMMARY OF THE INVENTION

In one embodiment, the invention is a method for predicting hydrocarbon production potential of a subsurface region from geophysical data including at least controlled source electromagnetic survey data ("CSEM data"), comprising:

(a) identifying a target region within the subsurface region, characterized by resistivity higher than background or other indication of hydrocarbon potential;

(b) defining at least two classification categories for the target region, each category being characterized by one or more different factors related to hydrocarbon production potential, and estimating for each category a prior probability that the anomaly region is in that category, said probability being estimated without taking into account the geophysical data, wherein the at least two categories are mutually exclusive and collectively exhaustive;

(c) selecting one or more rock/fluid properties that affect electrical properties of rock and other corresponding properties if another data type besides CSEM data are included in the geophysical data;

(d) estimating a probability density for each rock/fluid property selected in (c), and repeating for each category if a property is treated as being category dependent;

(e) using the probability densities for the rock/fluid properties, and a quantitative relationship for computing components or derivative quantities of the geophysical data from values of the rock/fluid properties, to construct, for each category, conditional joint probability distributions for the geophysical data in the target region, each said conditional joint probability distribution being a probability of occurrence of one or more observed geophysical data values or one or more quantities derived therefrom, given occurrence of a given category;

(f) selecting at least one specific data observation from the geophysical data, or derived there from, corresponding to the target region, and using Bayes's Rule to combine the specific data with the prior probabilities for each category and the conditional joint probability distributions for the observed data to obtain updated ("posterior") probabilities for each category; and (g) using the updated probabilities to predict hydrocarbon potential of the target region.

The invention is particularly useful for a subsurface region consisting of multiple porous layers that contain hydrocarbons, interbedded with impermeable non-reservoir rock such as shale. The thin hydrocarbon containing layers may be beneath seismic resolution capability, but the present inventive method is capable of transforming two-component (horizontal and vertical) resistivity values such as can be generated by anisotropic inversion of the CSEM data into an estimate of the resistivity of the reservoir, i.e. of the interbedded, potentially hydrocarbon-bearing layers. Frequently, such a region with interbedded thin layers will be identified by its exhibiting an anomalously high resistivity value compared to the background regions. Two or more prospects may thus be classified on a scale and compared one to the other. As persons who work in the technical field will readily understand, practical applications of the invention involve use of a programmed computer.

BRIEF DESCRIPTION OF THE DRAWINGS

The present invention will be better understood by referring to the following detailed description and the attached drawings in which.

The invention will be described in connection with example embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

This invention uses two-component (horizontal and vertical) resistivity values such as can be generated by anisotropic inversion to obtain an estimate of the resistivity of reservoir intervals. The thickness of these reservoir intervals can be below the resolution of the CSEM data. Instead of trying to make a deterministic prediction about the presence of a hydrocarbon-bearing reservoir, the invention uses a probabilistic approach to classify the observed response into multiple geologic categories.

Figure 2:
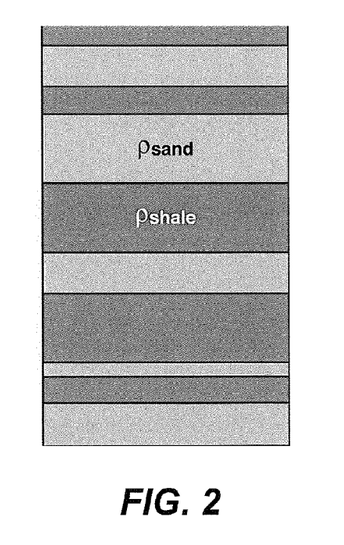
FIG. 2 is a 1D model of a typical hydrocarbon reservoir consisting of multiple porous layers that contain hydrocarbons, interbedded with impermeable non-reservoir rock such as shale.

Hydrocarbon reservoirs typically consist of multiple porous layers that contain hydrocarbons, interbedded with impermeable non-reservoir rock such as shale. FIG. 2 illustrates such a situation. The ratio (N/G) of the total thickness of the reservoir package to the total thickness of the porous intervals is commonly called "net-to-gross". Note that, although FIG. 2 illustrates a clastic reservoir where the porous and non-porous rocks are sandstones and shales, the same concept applies to carbonate reservoirs.

Partly because of this kind of layering, resistivities in sedimentary basins are commonly observed to be strongly anisotropic—current flowing in the horizontal direction usually experiences less resistance than current flowing in the vertical direction. The more advanced inversion algorithms (Commer and Newman [1]) are equipped to handle anisotropic resistivity, and produce estimates of both the vertical and horizontal resistivities at each point in the subsurface. Srnka [13] showed that, if all the sands are assumed to have the same resistivity and all the shales are assumed to have the same resistivity, and the layers are assumed to extend an infinite distance in all directions, one can derive the following equations that relate the two components of resistivity that come out of inversion ($\rho_H$ and $\rho_V$) to the resistivities of the porous and non-porous intervals ($\rho_{sand}$ and $\rho_{shale}$) with net-to-gross ratio NG defined as the sand thickness divided by the total thickness for a layered earth model such as the one illustrated in FIG. 2.

$$\rho_H = [NG/\rho_{sand} + (1-NG)/\rho_{shale}]^{-1} \quad (1)$$
$$\rho_V = NG\rho_{sand} + (1-NG)a\rho_{shale}$$

$$\rho_{sand} = \frac{-[\rho_H(a(1-NG)^2 - NG^2) - \rho_V] \pm \sqrt{[\rho_H(a(1-NG)^2 - NG^2) - \rho_V]^2 - 4NG^2\rho_H\rho_V}}{2NG} \quad (2)$$

$$\rho_{shale} = \frac{\rho_V - NG\rho_{sand}}{a(1-NG)}$$

The factor a allows for intrinsic anisotropy in the shale, and may be assigned a value $a = \rho_{Vshale}/\rho_{Hshale}$.

Several difficulties arise, however, when trying to actually use these equations. First, they require knowledge of net-to-gross, and this quantity is known, at best, only approximately. Second, there are two solutions to the quadratic equations (2), and there is no mathematical reason to choose one over the other. Finally, every solution for $\rho_{sand}$, the quantity of most interest, implies a specific value for $\rho_{shale}$. These $\rho_{shale}$ values may not always be geologically realistic.

The motivation for estimating $\rho_{sand}$ is to be able to use its value to identify hydrocarbon-bearing intervals. In well log analysis, this is accomplished using a mathematical relationship between the resistivity of the potentially hydrocarbon-bearing interval and various rock properties related to hydrocarbon presence. A commonly used relationship (Mavko et al. [8], Chapter 9.4) is Archie's Law:

$$\rho_{sand} = \rho_W \phi^{-m} S_W^{-n} \quad (3)$$

where $\rho_W$ is the resistivity of the formation water, $\phi$ is the porosity of the reservoir rock, $S_W$ is the fraction of the pore space filled with formation water, and m and n are empirical values that are typically near 2. In well log analysis, $\rho_W$ can be measured directly by sampling the formation water, and $\phi$ is known from other well logs, so the value of $\rho_{sand}$ observed on a resistivity log can be used in Archie's Law to calculate the water saturation $S_W$. If $S_W$ is significantly less than 1, the pores must be partially filled with a non-conductive fluid, normally hydrocarbons.

Archie's Law cannot be applied directly to resistivities from a CSEM survey because, even if equations (2) were used to get an estimate of $\rho_{sand}$, most of the other quantities needed to compute $S_W$ would still be unknown. This invention circumvents this issue, and also avoids the difficulties involved in solving the anisotropy equations (2), by using a probabilistic approach. Instead of specifying deterministic values for the parameters needed to evaluate these equations, the parameters are specified as probability densities.

Variations or alternatives may exist for the quantitative relationships provided by the anisotropy equations and Archie's Law, particularly since both have empirical components. All such relationships are within the scope of the invention.

It is common practice in petroleum exploration to perform probabilistic assessments of prospects, as described in, for example, Newendorp [10] and Rose [11], to estimate the volume of trapped hydrocarbons. For exploration prospects, there are usually no direct measurements of the rock properties that affect hydrocarbon volume. Consequently, the parameters needed to estimate volume must be specified as probabilities and probability densities, where the probabilities are estimated based on the available indirect information. A probabilistic prospect assessment will typically be performed on any significant resistivity anomaly detected by a CSEM survey. This invention uses a subset of the information from the prospect assessment to perform a probabilistic classification of the CSEM-derived resistivity. The information from the prospect assessment will not include any information derived from the CSEM survey data, or from seismic data if seismic data are used in step 307 along with CSEM data; however qualitative seismic information may be used for the probabilistic prospect assessment.

Figure 3:
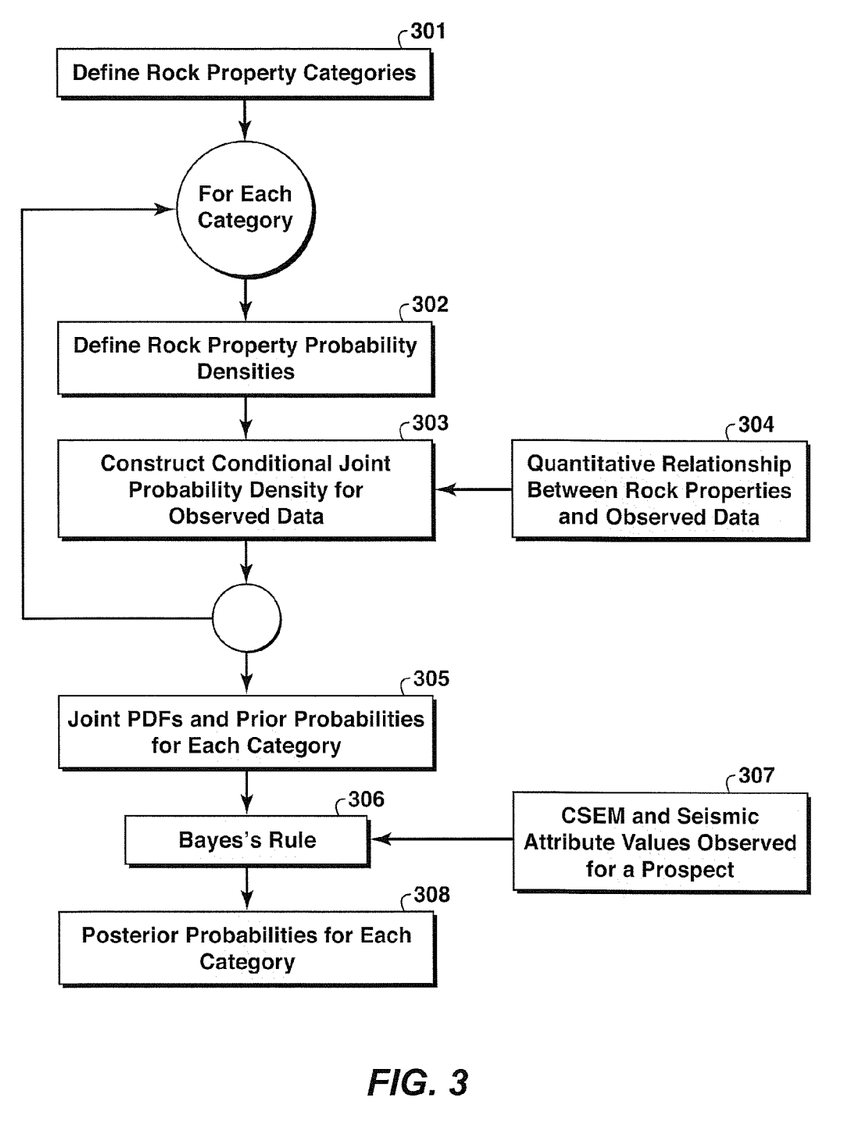
FIG. 3 is a flow chart showing basic steps in one embodiment of the present inventive method.

FIG. 3 shows basic steps in one embodiment of the present inventive method for classifying a CSEM-derived resistivity (and, optionally, other types of geophysical data such as seismic amplitudes, velocities, or other quantitative seismic information) observed on a particular target prospect. The first step (301) is to define a set of categories of possible rock and fluid properties that might be present at the target prospect. Each category is characterized by a possible condition of the rock that pertains to the capacity of the rock for holding hydrocarbons and whether the rock actually contains hydrocarbons. These categories characterize the state of knowledge about the prospect before considering the CSEM information. As a condition for applying Bayes's Rule, sometimes called Bayes's theorem, the set of categories must be defined so that they are mutually exclusive and collectively exhaustive—all possible outcomes for the prospect must fall into one and only one of the defined categories. The prospect assessment process must define at least two categories: a hydrocarbon bearing reservoir, and a catch-all "failure" category that includes all other possibilities. Normally, however, different factors related to hydrocarbon presence are assessed separately. For example, factors such as the presence of hydrocarbon source rock, the presence of good quality reservoir rock, and the existence of a hydrocarbon trap might be assigned separate probabilities. This makes it possible to subdivide the "failure" category into more specific areas, such as "good quality reservoir rock saturated with water", "poor quality reservoir rock saturated with water", and "non-reservoir rock." Then, to complete step 301, a "prior" probability (i.e., a probability estimated from available information but without considering the CSEM information) is computed or otherwise estimated for each category. These probabilities are called prior because they do not take into account certain information, in this case the CSEM data.

The next step (302) is to define, for each category, probability density functions (sometimes referred to as PDF's) for the rock properties that affect the electrical and elastic properties of the rock. (A probability density function $F(\phi)$ gives the probability $F(\phi)\Delta\phi$ that a variable such as porosity has a value within a small increment $\Delta\phi$ centered at $\phi$.) For example, porosity and water saturation are needed for Archie's Law, and net-to-gross is needed for the anisotropy equations (1) and (2). In one embodiment of the invention, probability densities for all three of these rock properties are estimated during prospect assessment because they are needed to compute hydrocarbon volume. Probability densities for the other properties required for computing CSEM resistivities, such as the shale resistivity $\rho_{shale}$ and anisotropy a and the formation water resistivity $\rho_W$, must be estimated from external sources. It might also be necessary to estimate probability densities for some of the "failure" categories that do not have probability densities from prospect assessment. For example, poor quality reservoir rock (rock that is porous but has porosity that is too low to contain recoverable amounts of hydrocarbons) might produce resistivities similar to those encountered in hydrocarbon-bearing rocks with higher porosity, and should be included as a specific category. Finally, if seismic amplitude information is to be combined with CSEM information, additional probability densities associated with elastic properties must be specified.

The next step (303) is to construct a joint probability density for the components of the observed data, conditional on each of the rock and fluid categories. For CSEM, the "observed data" is the two-component resistivity produced by anisotropic inversion at the target prospect. If seismic amplitudes are to be considered, one or more seismic attributes, possibly offset-dependent, would be included as additional components of the observed data. The inputs to this step are the rock property probability distributions from step 302, and a quantitative relationship (step 304) for computing the components of the observed data from values of the rock and fluid properties. For CSEM, combining Archie's Law with the anisotropy equations (1) and (2) is one way to provide the relationship in step 304. For seismic amplitudes, a modeling approach like that described in Houck (2006) is one approach that can be used to compute the amplitude attributes from the rock properties.

In cases where a closed form relationship exists between the data and the rock properties, as is the case with CSEM, the joint probability density can be constructed by integrating the rock property probability densities over the region of property space defined by each possible observed resistivity pair ($\rho_H$, $\rho_V$):

$$P(\rho_H, \rho_V \mid C_i) = \int_{R(r;\rho_H,\rho_V)} P(r \mid C_i) \, dR \quad (4)$$

where $C_i$ is the $i^{th}$ rock/fluid class, r is the vector of rock and fluid properties that occur in whatever rock property relationships are being used (for example, in the anisotropy equations 2 and in Archie's Law): r=(N/G, $\phi$, $S_W$, $\rho_W$, $\rho_{shale}$, a, m, n), $P(r|C_i)$ is the joint probability density for the rock property random variables for class i, and R(r; $\rho_H$, $\rho_V$) is the region of the property space r defined by combining the anisotropy equations and Archie's Law and setting ($\rho_H$, $\rho_V$) to a specific value. In cases where the relationship 304 is not a closed form, as is the case with seismic amplitudes, the joint probability density can be constructed by Monte Carlo simulation, using a process like that described by Houck [6].

After steps 301-304 have been completed for all the classes, the result (305) is a collection of joint probability densities $P(d|C_i)$ for the observed data vector d, along with the prior probabilities $P(C_i)$ assigned to each category in step 301. The observed data d may consist of just the two resistivity components ($\rho_H$, $\rho_V$), or it may also include one or more seismic amplitude attributes. When combined with a specific data observation $d_p$ measured on the target prospect (step 307), the probabilities from step 305 can be substituted into Bayes' Rule (step 306) to compute a new posterior probability for each rock/fluid category, i.e. a probability that has been undated by the observed data (308):

$$P(C_i | d_p) = P(C_i) \frac{P(d_p | C_i)}{\sum_{j=1}^{N} P(C_j) P(d_p | C_j)} \quad (5)$$

where $P(C_i)$ is the prior probability estimated at step 301 (that the $i^{th}$ category is correct), and the sum over j is a sum over all categories defined in step 301, and P(A|B) is defined as the conditional probability of A, given B.

The term "observed data" or "data observation" as used above in the discussion of step 306 and elsewhere herein refers to a set of quantitative attribute values (i.e., numbers) derived from CSEM and, optionally, seismic (or other geophysical) data sets. For CSEM, the "observed data" may typically be a pair of horizontal and vertical resistivities generated by performing anisotropic inversion using the recorded (and processed) CSEM survey data. For seismic, the "observed data" might be values of seismic amplitude attributes, such as peak amplitude and RMS amplitude, derived from a migrated seismic data volume; these attributes could also be extracted at different source-receiver offsets to include AVO effects. One might also use seismic interval velocities; these are routinely estimated during processing of a seismic survey.

This process of FIG. 3 not only identifies the rock/fluid category that is most likely to have produced the observed data, but, because it assigns probabilities to all the categories, it identifies all the categories that are consistent with the observed data. In petroleum exploration, it may be economically justified to drill a prospect even if it is likely to be something other than a hydrocarbon-bearing reservoir. This approach can be used for pre-survey Value of Information (VOI) analysis as well as for post-survey prospect evaluation. Eidsvik et al. [2] present a VOI analysis that includes CSEM data. However, their approach applies Archie's Law directly to CSEM-derived resistivities and is therefore inappropriate for most hydrocarbon reservoirs.

The method of FIG. 3 has some similarities to probabilistic classification approaches that have been used with seismic amplitude information; see Houck [4] and Mukerji et al. [9] for some early examples, and Spikes et al. [12] for a recent application. The present invention does not, however, simply add another variable (resistivity) to a known method. To use CSEM-derived resistivity in this process, one has to deal with the fact that the reservoir intervals that are to be evaluated are normally too thin to be seen as separate units by the CSEM method. A preferred embodiment of the present invention, described above, uses a probabilistic version of Srnka's 1D anisotropy relationship to relate CSEM-derived anisotropic resistivity to the formation resistivity required by Archie's Law. An alternative embodiment is to perform probabilistic modeling of multiple realizations of sand-shale sequences. This is more realistic than using Srnka's anisotropy relationship, but also requires more input information and is more computationally demanding.

The low vertical resolution of the CSEM method is a problem partly because the CSEM data are inverted separately from the seismic data. If a joint inversion of the CSEM and seismic data could be performed, the resulting model would have the resolution of the seismic data set and would be capable of characterizing seismic-scale reservoir intervals that have elastic properties that are sufficiently different from those of the surrounding rock. This is illustrated by Hoversten et al. [7], who present an example of a 1D joint inversion of CSEM and seismic data. However, practical algorithms for the 3D joint inversion needed to map hydrocarbon reservoirs do not yet exist.

Harris [3] describes a specific approach for combining seismic, CSEM, and well log information to make numerical predictions of rock properties. This method appears to closely follow the workflow of a commercial software package that is commonly used for seismic data (EMERGE, developed by Hampson-Russell Software; for product information, see http://www.cggveritas.com/default.aspx?cid=855).

EMERGE includes an alternative option for performing rock property predictions (a most probable value, not a probability density) using a probabilistic neural network instead of a least squares data fit. The Harris approach is appropriate for a producing field where one has an extensive well log database that is sufficient to characterize rock property variations over the entire field, and where one needs a full 3D representation of rock properties to be used in, for example, reservoir simulation. The current invention is most advantageous for exploration situations where little or no well log information is available, and where the objective is just to evaluate specific prospects, not to characterize an entire field.

Joint inversion and the Harris [3] approach both use seismic data to improve on the resolution of CSEM data. These methods have the advantage of being able to identify specific reservoir layers, provided the layers are thick enough to be resolved by seismic. However, if reservoir units are below even seismic resolution, as is often the case, these approaches will underestimate the reservoir resistivity and produce incorrect estimates of rock properties. The probabilistic classification approach used in the present invention can handle sub-resolution reservoir layering, with a tradeoff being that it does not attempt to identify specific layers.

Although CSEM inversion (typically how observed data values are obtained for step 307) generates resistivity values for every point in a 3-dimensional region under the receivers, it is usually not desirable to apply this method to every point in the resistivity volume. The rock property probability densities generated in step 302 by prospect assessment are intended to characterize only the prospect being assessed (e.g. region 104 in FIG. 1), and cannot usually be extended to the entire survey region (the region below the receivers 103). Also, the anisotropy equations (1) and (2) assume a 1D model—layering that continues laterally an infinite distance.

This assumption is never really valid, but it is closest to correct near the center of the prospect and is least valid near the edges.

Consequently, although it is formally possible to compute category probabilities for every point where the inversion produces a pair of resistivity values, these probabilities can be misleading. It is usually preferable to compute only a single set of probabilities for a prospect. For a prospect that has a higher resistivity than the surrounding rock, the 1D assumption is closest to being valid for the resistivity pair that has the highest vertical resistivity in the prospect region. Category probabilities preferably should be computed using this pair of resistivities.

Constructing the conditional probability densities (step 303) may be done for example by evaluating the probability integral in equation (4), or alternatively by performing a Monte Carlo simulation using the probability densities of the rock properties. The integration approach has the advantage of being faster and more accurate than Monte Carlo simulation. However, defining the region of integration requires a closed form relationship between rock properties and the observed data. Monte Carlo simulation can be used in any case where the observed data can be computed from a specific realization of the rock properties. The accuracy of Monte Carlo simulation can be improved by increasing the number of cases simulated.

In the Monte Carlo embodiments of the invention, the greatest computational effort is devoted to constructing the joint probability densities from the simulation outcomes. For probability densities involving only one variable, this can be accomplished simply by constructing a histogram. However, for the multidimensional probability densities used in this invention, a kernel-based approach such as is used by Houck [5] is desirable to more accurately represent the joint density.

EXAMPLE

Figure 4:
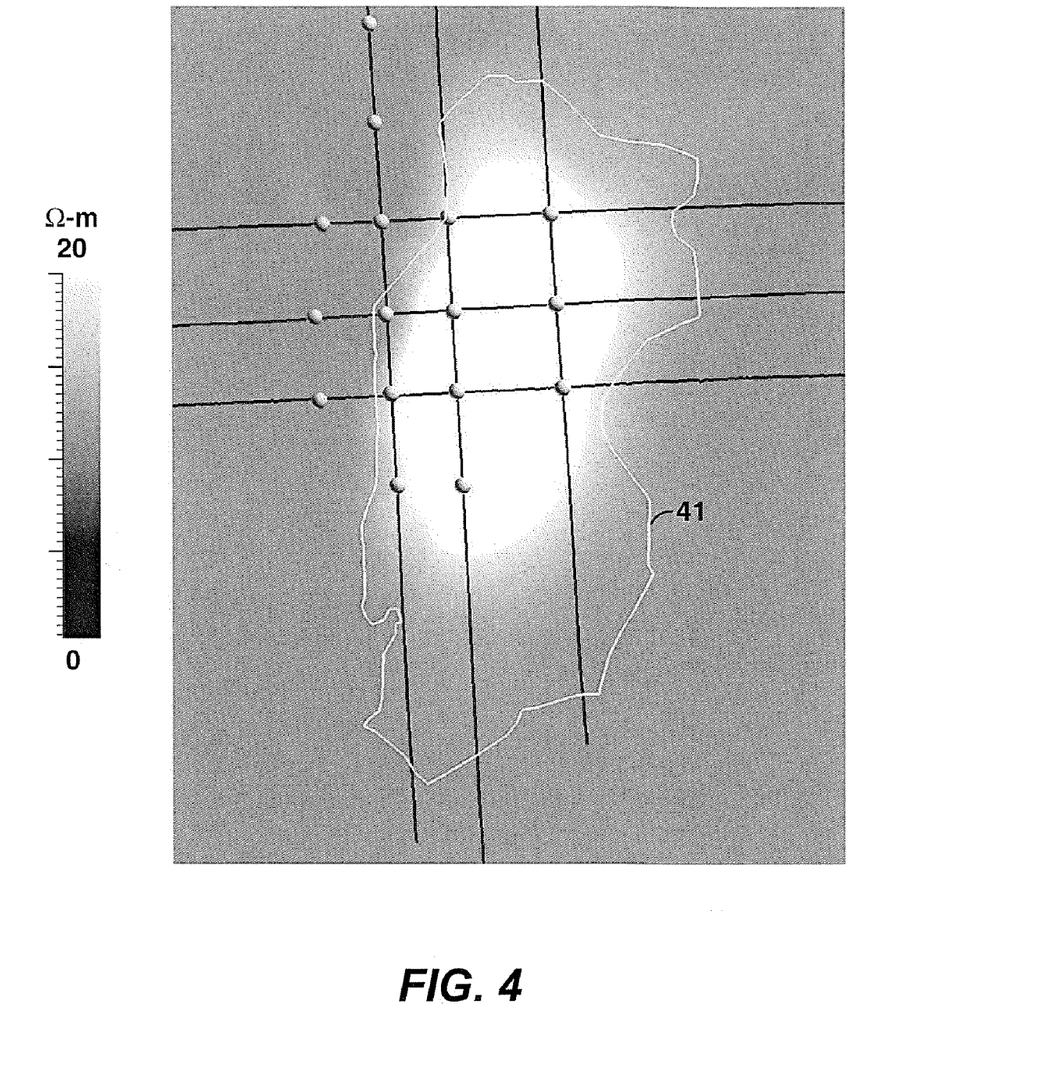
FIG. 4 shows a possible hydrocarbon trap for an example application of the present inventive method.

The following example illustrates the application of the invention to a resistivity anomaly in a modeled CSEM survey where seismic data are used to augment the CSEM data. (The invention is equally well suited for comparing two or more anomaly regions or other target regions from the same survey area.) FIG. 4 is a map of vertical resistivity (magnitude indicated by the gray scale) derived from anisotropic inversion of the modeled CSEM data set. The black lines in FIG. 4 are the transmitter towlines for the modeled survey and the gray spheres are the receiver locations. The input resistivity volume (not shown in the drawings) used to generate the synthetic CSEM data has three high-resistivity (150 Ω-m) layers inside the white polygon 41, embedded in a 12 Ω-m background. The highest inversion resistivity inside the high-resistivity region in FIG. 4 is 36.9 Ω-m, and the horizontal resistivity (not shown) at the same location is 5.1 Ω-m. The seismic interval velocity computed from the input velocity model over the resistive interval is 3000 m/s. (In this example, a velocity model was derived from the resistivity model by assuming that the sands had 18% porosity and 12% water saturation, which yields 150 Ω-m for the sand resistivity for 0.07 Ω-m water. Then a published empirical relationship was used to compute the velocity for the individual HC sands (3170 m/s) and, using the 2900 m/s shale velocity that was observed near the prospect depth, the interval velocity was computed for 40% N/G.) This example will classify this observed response ($\rho_H$=5.1, $\rho_V$=36.9, $V_I$=3000) as an indicator of a potential hydrocarbon reservoir.

The assessment of the hypothetical prospect provides a basis for defining rock property categories, as required at step 301 in FIG. 3. Assume that, during assessment, the prospect is assigned an 80% probability of having reservoir rock present, 80% probability that the reservoir rock, if present, will be good quality, and 40% probability that hydrocarbons were generated and that a trap exists on the prospect. "Good" quality reservoir is assessed as having porosity between 0.15 and 0.3, with a most likely value of 0.2. To allow for rock with lower porosity than assessed for the prospect, "Fair" and "Poor" porosity categories are also defined. Each of these three reservoir types may or may not contain hydrocarbons, and it is possible that reservoir rock may be entirely absent. Table 1 lists the resulting set of seven rock property categories. The prior probability values in Table 1 were computed by multiplying appropriate combinations of the probabilities assigned during assessment, following standard rules of probability theory. The next phase in this example is to use the assessment-derived probability densities for the rock properties to construct, for each category, the joint probability densities for the observed data. This corresponds to steps 302-304 in FIG. 3. Table 2 lists the probability densities for the rock properties (step 302). In this example, and not to limit the invention, all properties are assumed to follow stretched beta distributions with the specified minimum, most likely, and maximum values. (Other distributions, e.g. triangular, could have been used.) This example uses Monte Carlo simulation to construct the joint distribution of horizontal resistivity, vertical resistivity, and interval velocity for each category (step 303). The quantitative relationship between the rock properties in Table 2 and horizontal and vertical resistivity (step 304) is provided by the anisotropy equations (2) combined with Archie's Law. For seismic velocity, the Wyllie time-average equation:

$$\frac{1}{V} = \frac{(1-\phi)}{V_M} + \frac{\phi}{V_F} \tag{6}$$

can be used to compute the velocity of the porous(sand) intervals, where $V_M$ is the velocity of the rock matrix and $V_F$ is the velocity of the pore fluid; velocity for an interbedded sand-shale depth interval is computed as a harmonic average of sand and shale velocities. Seismic velocity parameters are all treated as random variables and are listed at the bottom of Table 2. Because the categories are defined (Table 1) based on whether porosity is good, fair or poor, probability distributions for porosity are specified in Table 2 for each category. The same is true for net:gross ratio and water saturation, but the reason in these two cases is that they are needed in the anisotropy equations and in Archie's Law and they depend on porosity.

TABLE 1

Observation for Conditional Probabilities:
$\rho_H$ = 5.1 Ω-m, $\rho_V$ = 36.9 Ω-m, V = 3000 m/s

| Category | Prior Probability | P (Obs/Category) $\rho_H, \rho_V, V$ | $\rho_H, \rho_V$ |
|---|---|---|---|
| Good Porosity with HC | 0.26 | 0.0012 | 0.0134 |
| Fair Porosity with HC | 0.03 | 0.0006 | 0.0159 |
| Poor Porosity with HC | 0.03 | 0.0487 | 0.3643 |
| Good Porosity, no HC | 0.38 | 0 | 0 |
| Fair Porosity, no HC | 0.05 | 0 | 0 |
| Poor Porosity, no HC | 0.05 | 0.0005 | 0.0093 |
| No Porosity, no HC | 0.20 | 0 | 0 |

TABLE 2

|  | Min | MostLikely | Max |
|---|---|---|---|
| Porosity (Good) | 0.15 | 0.2 | 0.3 |
| Porosity (Fair) | 0.08 | 0.12 | 0.2 |
| Porosity (Poor) | 0.01 | 0.07 | 0.12 |
| N/G (Good/Fair) | 0.3 | 0.5 | 0.8 |
| N/G (Poor) | 0.1 | 0.3 | 0.5 |
| $S_W$ (Fair) | 0.1 | 0.2 | 0.3 |
| ρ (water) | 0.2 | 0.3 | 0.4 |
| ρ (shale) | 0.022 | 0.0535 | 0.1 |
| ShaleAnisotropy | 1 | 4 | 9 |
|  | 2 | 2.5 | 3 |
| $V_m$ | 5000 | 5400 | 5800 |
| Vf (HC) | 1000 | 1100 | 1200 |
| Vf (Wet) | 1585 | 1615 | 1645 |
| V (Shale) | 2700 | 2800 | 2900 |

Figure 5A:
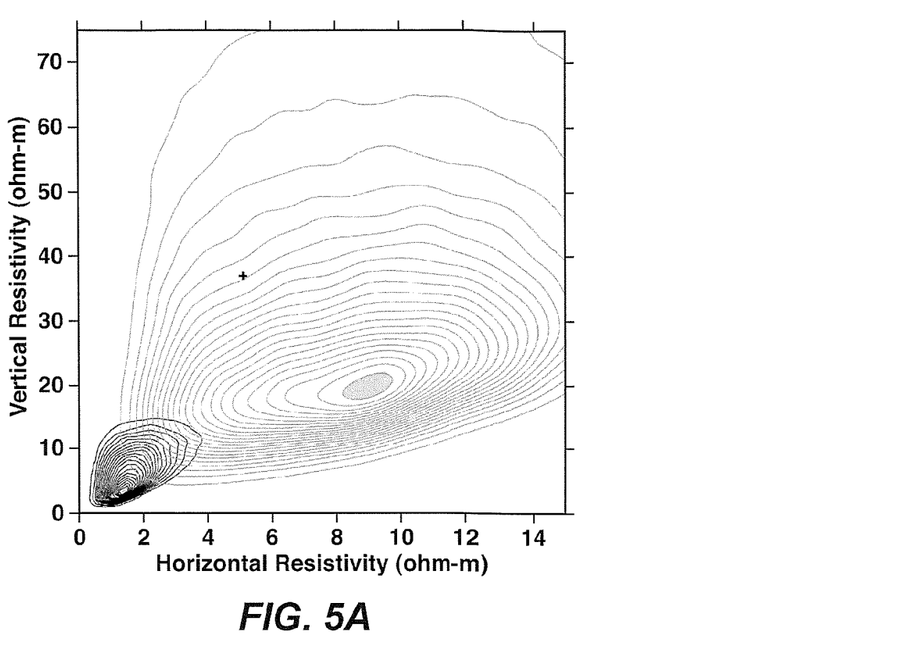
FIGS. 5A-5B show two examples of the joint probability densities calculated for the example exercise.
Figure 5B:
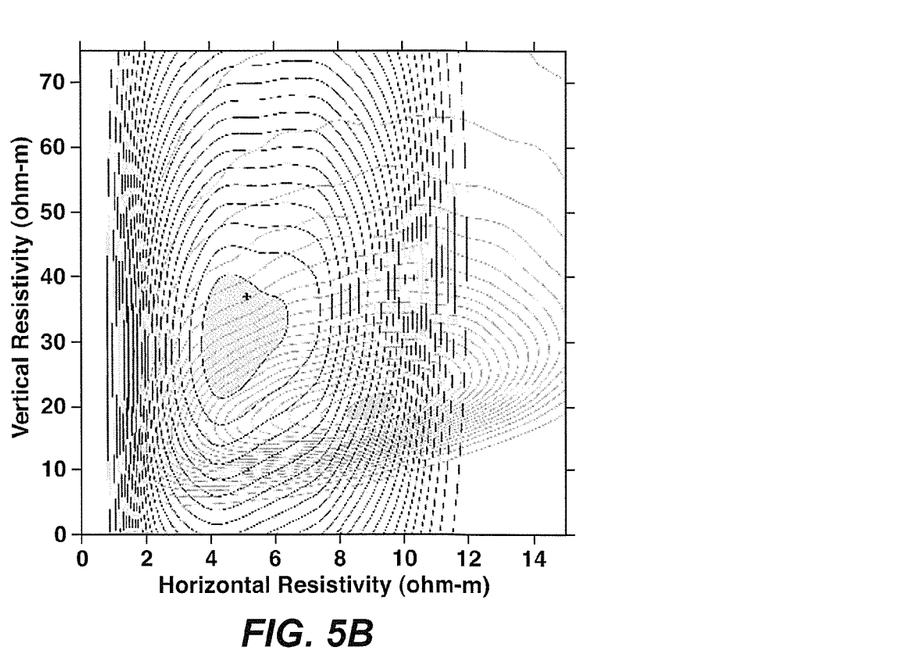

The joint probability densities $P(\rho_H, \rho_V, V_I | C_i)$ produced by the simulation process are, in this example, defined over a 3-dimensional space. FIGS. 5A-B show examples of slices through these 3-dimensional functions at the observed velocity (3000 m/s). In FIG. 5A, the gray contours indicate the probability of observing a particular pair of horizontal and vertical resistivities if the "Good Porosity with HC" category is present on the prospect, and the black contours indicate the probability if the "Good Porosity, no HC" category is present. Probability increases towards the shaded region in the center of each of the two contour patterns. FIG. 5A shows that the hydrocarbon-bearing category tends to produce higher resistivities than the non-hydrocarbon case, but there is some overlap. Either category could have produced the resistivities within the region of overlap. In FIG. 5B, the black contours indicate the probability of observing a particular pair of horizontal and vertical resistivities if the "Poor Porosity with HC" category is present on the prospect; gray contours still indicate "Good Porosity with HC". These two categories overlap over much of the plot area. Displaying probability contours for all seven of the categories (step 305) would show that there are two or more overlapping categories over most of the area of the plot. This means that a specific resistivity and velocity observation will usually be insufficient to uniquely identify the rock property category. Applying Bayes' Rule (step 306) quantifies this inherent ambiguity.

The conditional probabilities $P(d_p | C_i)$ needed for Bayes's Rule come from evaluating the joint probability densities from step 305 at the resistivity and velocity values observed on the prospect (307). For example, the two + symbols in FIGS. 5A and 5B indicate the CSEM resistivities observed on the model prospect. Since both plots are slices through the three-dimensional joint probability density at the observed V=3000 m/s, the markers indicate the conditional probabilities required for Bayes's Rule. FIGS. 5A-B show that the observations are consistent with both "Good Porosity with HC" and "Poor Porosity with HC," and are not consistent with "Good Porosity, no HC." The two right-hand columns in Table 1 list the numerical values for the conditional probability of getting the observed resistivities and velocity from each of the seven categories. Table 1 shows that observed resistivities and velocity are about 40 times more likely to be occur if the "Poor Porosity with HC" category is present on the prospect than if the "Good Porosity with HC" category is present. What is desired, however, is not the probability $P(d_p | C_i)$ that the observed resistivities could have been produced by a specific category, but the probability $P(C_i | d_p)$ that a specific category is present on the prospect, given the observed resistivity.

These "posterior" probabilities are computed by substituting the conditional probabilities $P(d_p | C_i)$ in Table 1 into Bayes's Rule to update the prior probabilities $P(C_i)$. Table 3 lists the results of these computations. The observed CSEM resistivities and seismic velocity have ruled out the possibility of having non-reservoir rock, or "good" or "fair" porosity reservoir rock with no hydrocarbons. This happens because the conditional probabilities in Table 1 for these three categories are all zero—no combination of the rock properties allowed by Table 2 produces resistivities like the ones observed on the model prospect. The probability originally assigned to these categories is redistributed to the remaining categories by Bayes's Rule.

Table 3 shows that the most likely outcome based on the CSEM and seismic information is "Poor Porosity with HC"; three other categories are also possible, but with much lower probabilities. The rightmost column in Table 1 lists the conditional probabilities of observing $\rho_H$=5.1 and $\rho_V$=36.9, assuming no observation of seismic velocity has been made. The rightmost column in Table 3 lists the resulting posterior probabilities. Observing resistivity without observing velocity results in only a small change in the post-observation probabilities and still has "Poor Porosity with HC" as the most likely outcome for the prospect. This means that, in this case, the information contained in the observation of seismic velocity does not add significantly to the information already present in the observation of anisotropic resistivity. However, this is not always true, even for the categories used in this example. If the observed seismic velocity had been 2800 m/s instead of 3000 m/s, the conditional probabilities for the combined CSEM-seismic observation would have been significantly different from those in Table 1, and the resulting posteriors would have "Good Porosity with HC" as the most likely outcome.

TABLE 3

| | P (ACategory/Obs) | |
|---|---|---|
| Category | $\rho_H, \rho_V, V$ | $\rho_H, \rho_V$ |
| Good Porosity with HC | 0.044 | 0.061 |
| Fair Porosity with HC | 0.024 | 0.073 |
| Poor Porosity with HC | 0.918 | 0.834 |
| Good Porosity, no HC | 0 | 0 |
| Fair Porosity, no HC | 0 | 0 |
| Poor Porosity, no HC | 0.014 | 0.032 |
| No Reservoir Rock | 0 | 0 |

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

1. Commer, M. et al. (2006) "Large Scale 3D EM Inversion Using Optimized Simulation Grids Non-Conformal To The Model Space," *Society of Exploration Geophysicists Annual Meeting Expanded Abstract*, 25, pp. 760-764.
2. Eidsvik, J. et al. (2008) "Value of Information of Seismic Amplitude and CSEM Resistivity," *Geophysics*, 73, pp. R59-R69.
3. Harris, P. et al. (2008) "Method for Interpreting Seismic Data and Controlled Source Electromagnetic Data to Estimate Subsurface Reservoir Properties," U.S. Patent Application US 2008/0162050 A1.
4. Houck, R. T. (1998) "Estimating Uncertainty in Interpreting Seismic Indicators," *Society of Exploration Geophysicists Annual Meeting Expanded Abstract*, 17, pp. 632-635.

5. Houck, R. T. (2002) "Quantifying the Uncertainty in an AVO Interpretation," *Geophysics,* 67, pp. 117-125.
6. Houck, R. T. (2006) "Method for Controlling Seismic Coverage Using Decision Theory," U.S. Pat. No. 6,999,879.
7. Hoversten, G. M. et al. (2006) "Direct Reservoir Parameter Estimation Using Joint Inversion of Marine Seismic AVA and CSEM Data," *Geophysics,* 71, pp. C1-C13.
8. Mavko, G. et al. (1998) *The rock physics handbook,* Cambridge University Press, Chapter 9.4.
9. Mukerji, T. et al. (1998) "Applying Statistical Rock Physics and Seismic Inversions to Map Lithofacies and Pore Fluid Probabilities in a North Sea Reservoir," *Society of Exploration Geophysicists Annual Meeting Expanded Abstract,* 17, pp. 890-893.
10. Newendorp, P. D. (1975) *Decision analysis for petroleum exploration,* Penn Well.
11. Rose, P. (2001) *Risk analysis and management of petroleum exploration ventures,* Penn Well.
12. Spikes, K. et al. (2007) "Probabilistic Seismic Inversion Based on Rock Physics Models," *Geophysics,* 72, pp. R87-R97.
13. Srnka, L. J. (2003) "Remote Reservoir Resistivity Mapping," U.S. Pat. No. 6,603,313.

The invention claimed is:

1. A method for predicting hydrocarbon production potential of a subsurface region from geophysical data including at least controlled source electromagnetic survey data ("CSEM data"), comprising:
    (a) identifying an anomaly region within the subsurface region, characterized by resistivity higher than background or other indication of hydrocarbon potential;
    (b) defining at least two classification categories for the anomaly region, each category being characterized by one or more different factors related to hydrocarbon production potential, and estimating for each category a prior probability that the anomaly region is in that category, said probability being estimated without taking into account the geophysical data, wherein the at least two categories are mutually exclusive and collectively exhaustive;
    (c) selecting one or more rock/fluid properties that affect electrical properties of rock and other corresponding properties if another data type besides CSEM data are included in the geophysical data;
    (d) estimating a probability density for each rock/fluid property selected in (c), and repeating for each category if a property is treated as being category dependent;
    (e) using the probability densities for the rock/fluid properties, and a quantitative relationship for computing components or derivative quantities of the geophysical data from values of the rock/fluid properties, to construct, for each category, conditional joint probability distributions for the geophysical data in the anomaly region, each said conditional joint probability distribution being a probability of occurrence of one or more observed geophysical data values or one or more quantities derived therefrom, given occurrence of a given category;
    (f) selecting at least one specific data observation from the geophysical data, or derived there from, corresponding to the anomaly region, and using Bayes's Rule to combine the specific data with the prior probabilities for each category and the conditional joint probability distributions for the observed data to obtain updated ("posterior") probabilities for each category; and
    (g) using the updated probabilities to predict hydrocarbon potential of the anomaly region.

2. The method of claim 1, wherein anisotropic inversion is performed on the CSEM data yielding horizontal and vertical resistivity component data which are then used throughout the method whenever geophysical data are called for, or components or derivative quantities thereof.

3. The method of claim 2, wherein the anomaly region is characterized by layers of hydrocarbon bearing rock or sand alternated with impermeable non-reservoir rock, and the quantitative relationship for computing components or derivative quantities of the CSEM data from values of the rock/fluid properties is provided by Archie's Law and equations relating horizontal and vertical resistivity of the anomaly region to resistivity of the hydrocarbon layers and resistivity of the non-reservoir layers.

4. The method of claim 1, wherein the selected rock/fluid properties comprise quantities needed for input to the quantitative relationship.

5. The method of claim 3, wherein the selected rock/fluid properties comprise porosity, net-to-gross ratio, resistivity of formation water, fraction of pore space filled with formation water, and resistivity of the non-reservoir rock, and resistivity of the hydrocarbon bearing rock or sand which is computed from the other properties using Archie's Law.

6. The method of claim 1, wherein the at least two classification categories are at least one hydrocarbon bearing reservoir category, and at least one no-hydrocarbon category.

7. The method of claim 6, wherein the hydrocarbon-bearing category is divided into three categories: good porosity, fair porosity, and poor porosity; and the no-hydrocarbon category is divided into four categories: good porosity, fair porosity, poor porosity, and no reservoir rock.

8. The method of claim 1, wherein the one or more different factors related to hydrocarbon production potential comprise porosity and hydrocarbon presence or absence.

9. The method of claim 1, further comprising repeating the method for at least one additional resistive anomaly, and ranking the anomalies according to hydrocarbon production potential.

10. The method of claim 1, wherein the hydrocarbon production potential is indicated primarily by the category having the highest updated probability in (f), and secondarily by other categories with probabilities greater than a predetermined threshold.

11. The method of claim 1, wherein the conditional joint probability distributions are constructed by performing a Monte Carlo simulation using the probability distributions for the rock/fluid properties.

12. The method of claim 1, wherein the geophysical data consist of the CSEM data and the conditional joint probability distributions are constructed by integrating the rock/fluid property probability distributions using a closed form mathematical relationship between CSEM data and rock/fluid properties.

13. The method of claim 1, wherein the geophysical data comprise seismic data in addition to the CSEM data, and the other corresponding properties in (c) are elastic properties.

14. The method of claim 13, wherein the at least one specific data observation in (f) are vertical resistivity, horizontal resistivity and seismic velocity.

15. The method of claim 1, wherein at least two factors are used to characterize each defined classification category.

* * * * *